March 3, 1970 L. ENGELBRECHT ET AL 3,498,121
TEST PIECE CENTERING MEANS FOR STRESS-STRAIN MACHINES
Filed June 27, 1968
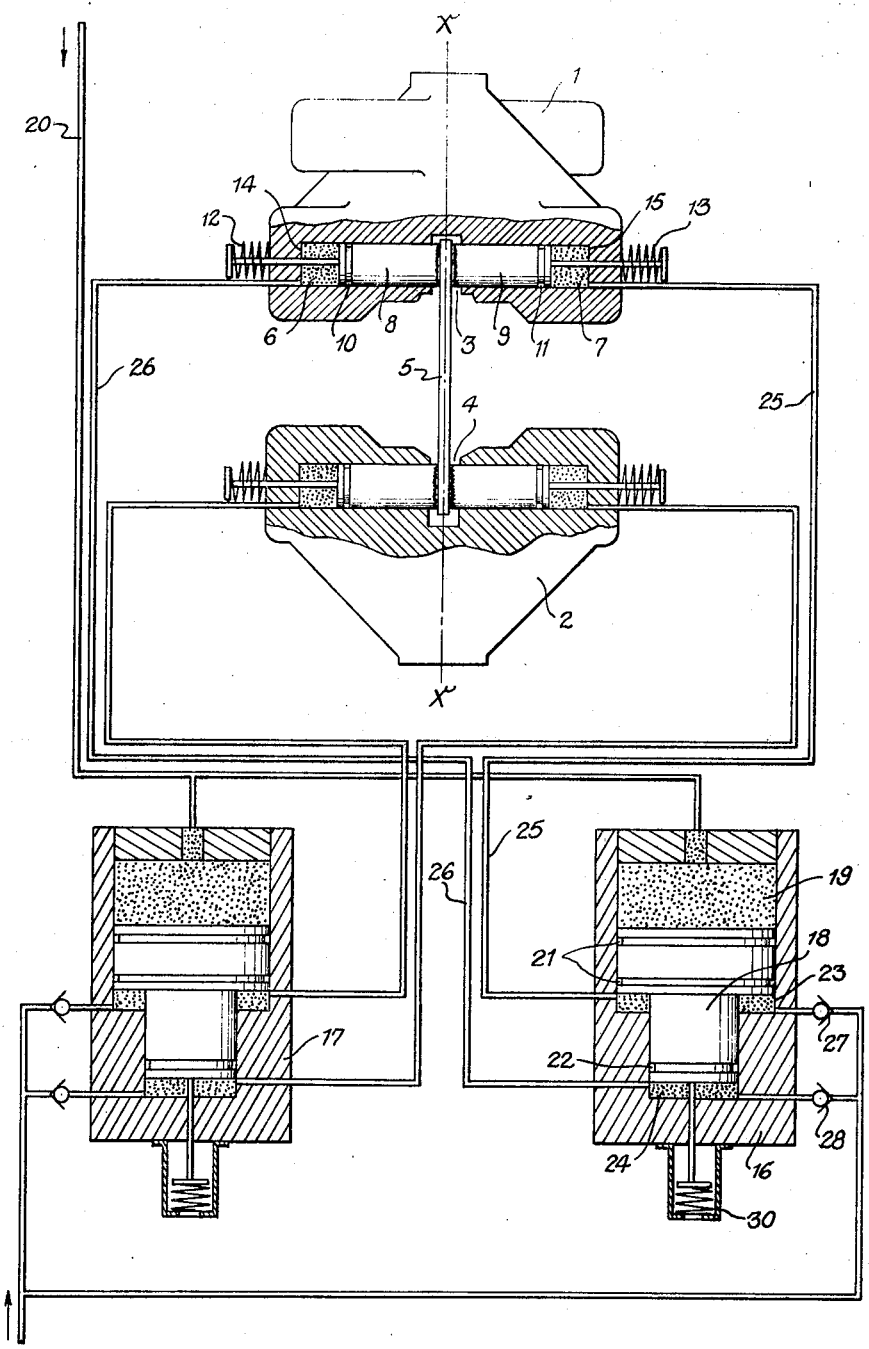
INVENTORS
Ludwig Engelbrecht
Edwin Mädlener
BY Stephens, Huettig and O'Connell
ATTORNEYS United States Patent Office 3,498,121
Patented Mar. 3, 1970

3,498,121
TEST PIECE CENTERING MEANS FOR STRESS-STRAIN MACHINES
Ludwig Engelbrecht and Edwin Madlener, Nuremberg, Germany, assignors to Maschinenfabrik Augsburg-Nuremberg Aktiengesellschaft, Nuremberg, Germany
Filed June 27, 1968, Ser. No. 740,592
Claims priority, application Germany, July 1, 1967, 1,648,616
Int. Cl. G01n 3/04
U.S. Cl. 73—103        3 Claims

ABSTRACT OF THE DISCLOSURE

Diametrically opposed hydraulically operated piston grippers are used to center a test piece in the heads of a stress-strain machine.

---

This invention relates to an apparatus for truly aligning a test piece with the axis of a stress-strain machine by means of hydraulically operated gripping pistons installed at each machine head.

It is known that test pieces must be inserted and held in tension in a stress-strain machine in such a manner that the test piece is exactly aligned with the center axis of the machine and secured thereto. Heretofore, wedge shoes have been used for this purpose, which shoes are inserted into wedge-like guide members so that the test piece is grasped increasingly tighter as the wedge effect increases. When the wedge shoes in the head were finally situated at the same level, then the true centering of the test piece was guaranteed. This position of the wedge shoes was not easily attainable and depended principally upon the skill of the operator in preparing the test machine for testing purposes. If the wedge shoes happened to be positioned at different heights, even if only by a small amount, then the test piece was disadvantageously stressed because it was not exactly aligned with the center machine axis and because it was additionally placed under an unintended bending stress because of its eccentricity.

In another testing apparatus, the test piece is first brought to a central position by a spindle on one side and then held on the other side by means of a diametrically positioned hydraulically operated piston mounted in a cylinder in the machine head. However, for example, as soon as oil under pressure was supplied to the piston, the attached part or sleeve of the spindle yielded because of the stronger hydraulic force which, in turn, again forced the workpiece from its center position. If the test piece was to be exactly centered in this apparatus, then the test piece must first be off-centered by means of the spindle by an amount determined by experience and experiments in order to be finally pushed back into true center position by means of the hydraulic piston. This operation for positioning a test piece was clumsy, time consuming, and did not guarantee an exact centering of the test piece.

The object of this invention is to produce an apparatus for bringing a test piece into central position automatically by hydraulic means and thereby avoiding time-consuming manual trial tests and while holding the test piece under tension.

In general, these objects are obtained by providing the machine heads with diametrically positioned hydraulically actuated pistons which are used to grip the ends of the workpiece and which pistons are held by equal force springs in their starting position at identical distances from the test piece. A further feature of this invention is that each pair of pistons in a machine head is actuated with oil under pressure which is supplied from two chambers in a stepped cylinder which are of equal size but hydraulically separated.

The means by which the objects of this invention are obtained are described more fully with reference to the accompanying schematic drawing which is a cross-sectional view through the apparatus.

The testing machine has two heads 1 and 2 which are identical. Each head has an opening 3 and 4, respectively, which are centered on the central axis or center line of the stress-strain machine and through which the ends of the workpiece 5 are inserted. Two diametrically opposed cylinders 6 and 7 in each head, respectively, open into openings 3 and 4, respectively. Pistons 8 and 9, respectively, are mounted in these cylinders. The pistons are provided with sealing rings 10 and 11, respectively, and have toothed end surfaces for gripping the test piece. In their initial starting positions, each piston 8 and 9 is pulled back by springs 12 and 13 to the back walls 14 and 15, respectively, of the cylinders 6 and 7. These back walls are each of the same distance from the center line of the machine and thus to the center line of workpiece 5.

A stepped cylinder 16 is used for actuating pistons 8 and 9 in the upper head 1 and a stepped cylinder 17 for actuating the corresponding pistons in the lower head 2. These stepped cylinders 16 and 17 are identical in shape and size and thus for reasons of simplicity only stepped cylinder 16 is described and by means of which cylinders 6 and 7 in head 1 are supplied with oil under pressure for moving pistons 8 and 9. Cylinder 16 contains a differential piston 18 with the larger piston head in cylinder chamber 19 which is supplied with oil under pressure through line 20 connected to a pump, not shown. Piston 18 has sealing rings 21 and 22 in order to prevent oil leakage and operates in chambers 23 and 24 which are of equal size. Pipe line 25 leads from chamber 23 to cylinder 7 and a second pipe line 26 leads from chamber 24 to cylinder 6 in head 1. When oil under pressure is forced through lines 25 and 26, the workpiece 5 is compressed from opposite sides. This is because piston 18 causes the movement of pistons 8 and 9. When the testing machine is erected, the pistons 8 and 9 are mounted symmetrically to the axis or center line $x$—$x$ of the machine and the pistons are movable toward this center line. Chambers 23 and 24 which communicate with lines 25 and 26 are filled with oil through check valves 27 and 28 which are connected to the common supply line 29 which leads to an oil supply tank. These lines are thoroughly de-aired so that the apparatus will work properly. All that is needed is a pressure on the differential piston 18 to immediately move pistons 8 and 9 symmetrically toward the center line of the machine and thereby hold the test piece under compression and exactly centered. The piston 8 can be moved by a spindle or by oil under pressure in chamber 19 supplied through line 20. In order to retract pistons 8 and 9 which take the place of wedge shoes very quickly after the test piece 5 has broken, return springs 12 and 13 are provided for pistons 8 and 9, respectively, and another spring 30 for returning piston 18.

Having now described the means by which the objects of this invention are obtained, we claim:

1. An apparatus for exactly aligning test pieces in a stress-strain machine comprising two heads for holding the ends of a test piece, a pair of hydraulically operated pistons in each head for gripping the ends of the test piece, spring means for holding said pistons at equal initial positions from said test piece, and stepped cylinder means (16, 17) containing two hydraulically separated chambers (23, 24) for supplying hydraulic fluid to said pistons in each head.

2. An apparatus as in claim 1, said stepped cylinder means including differential piston means movable by oil pressure.

3. An apparatus as in claim 2, further comprising fluid supply means, and check valve means (27, 28) for controlling fluid supplied to said chambers (23, 24).

References Cited

UNITED STATES PATENTS

| | | | |
|---|---|---|---|
| 2,596,772 | 5/1952 | Hawkes | 279—4 X |
| 3,076,662 | 2/1963 | Kostyrka | 279—4 |
| 3,323,357 | 6/1967 | Gloor | 73—103 |

JERRY W. MYRACLE, Primary Examiner

U.S. Cl. X.R.

279—4